United States Patent [19]
Jaffe

[11] 3,852,454

[45] Dec. 3, 1974

[54] TREATMENT OF RHEUMATOID ARTHRITIS

[75] Inventor: Israeli A. Jaffe, New York, N.Y.

[73] Assignee: Merck & Co., Inc., Rahway, N.J.

[22] Filed: June 15, 1973

[21] Appl. No.: 368,773

[52] U.S. Cl. .............................................. 424/263
[51] Int. Cl. .......................................... A61k 27/00
[58] Field of Search ........................... 424/263, 267

[56] References Cited
OTHER PUBLICATIONS

Chem. Abst. (1), 57, 2546f (1962).

Chem. Abst. (2), 58, 8214a (1963).

Chem. Abst. (3), 73, 129300j (1970).

Conn, Current Therapy, 1970, pp. 696–705.

*Primary Examiner*—Stanley J. Friedman

[57] ABSTRACT

5-Mercaptopyridoxine or pyrithioxine or pharmaceutically acceptable salts thereof are used in the treatment of rheumatoid arthritis.

3 Claims, No Drawings

TREATMENT OF RHEUMATOID ARTHRITIS

This invention is concerned with a method of treating rheumatoid arthritis and related inflammatory diseases with 2-methyl-3-hydroxy-4-hydroxymethyl-5-mercaptomethylpyridine known in the art as 5-mercaptopyridoxine, or its disulfide, pyrithioxine, or pharmaceutically acceptable salts thereof.

In spite of the extensive antiinflammatory research in the past two decades there is still an obvious need for an effective and well-tolerated agent for the treatment of rheumatoid arthritis. Conventional antiinflammatory-analgesic-antipyretic agents, such as aspirin, and many experimental new drugs under clinical evaluation, are mostly effective in providing symptomatic relief of the acute syndrome only. As a consequence, the antirheumatic actions of two other remedies, gold and particularly D-penicillamine, have received renewed interest in the past few years. The clinical efficacy of both drugs has been confirmed by well-controlled multi-center clinical studies. Impressed by these findings, a growing population of rheumatologists have expressed the opinion that a safer D-penicillamine-like compound should be a valuable contribution to medicine in this important field. Thus, it is an important discovery that another sulfhydryl compound, 5-mercaptopyridoxine and its disulfide dimer both possess antirheumatic properties comparable to that of D-penicillamine but with significantly fewer side effects, being of value in the treatment of rheumatoid arthritis and related inflammatory disorders but being free from the allergenic properties of D-penicillamine.

The pharmaceutically acceptable salts of the useful compounds include those prepared from mineral and organic acids commonly employed in the art, such as hydrochloric, hydrobromic, sulfuric, nitric, maleic, fumaric, tartaric, or succinic acids.

To practice the novel method of treatment of this invention, the active compounds or salts thereof may be administered orally, parenterally, by inhalation spray or rectally in dosage unit formulations containing conventional non-toxic pharmaceutically acceptable carriers, adjuvants, and vehicles. The term parenteral as used herein includes subcutaneous injections, intravenous, intramuscular, intrasternal injection or infusion techniques. In addition to the treatment of warm-blooded animals such as mice, rats, horses, dogs, cats, etc., it is effective in the treatment of humans.

The pharmaceutical compositions containing the active ingredient may be in a form suitable for oral use, for example, as tablets, troches, lozenges, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents, and preserving agents in order to provide a pharmaceutically elegant and palatable preparation. Tablets contain the active ingredient in admixture with non-toxic pharmaceutically acceptable excipients which are suitable for the manufacture of tablets. These excipients may be, for example, inert diluents, such as calcium carbonate, sodium carbonate, lactose, calcium phosphate or sodium phosphate; granulating and disintegrating agents, for example, maize starch, or alginic acid; binding agents, for example starch, gelatine or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period. For example, a time delay material such as glyceryl monostearate or glyceryl distearate may be employed.

Formulations for oral use may also be presented as hard gelatine capsules wherein the active ingredient is mixed with an inert solid diluent, for example, calcium carbonate, calcium phosphate or kaolin, or as soft gelatine capsules wherein the active ingredient is mixed with water or an oil medium, for example peanut oil, liquid paraffin, or olive oil.

Aqueous suspensions contain the active material in admixture with excipients suitable for the manufacture of aqueous suspensions. Such excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxycetanol, or condensation products of ethylene oxide with partial esters derived from fatty acids and a hexitol such as polyoxyethylene sorbitol monooleate, or condensation products of ethylene oxide with partial esters derived from fatty acids and hexitol anhydrides, for example polyoxyethylene soribtan monooleate. The said aqueous suspensions may also contain one or more preservatives, for example ethyl, or n-propyl, p-hydroxy benzoate, one or more coloring agents, one or more flavoring agents, and one or more sweetening agents, such as sucrose or saccharin.

Oily suspensions may be formulated by suspending the active ingredient in a vegetable oil, for example arachis oil, olive oil, sesame oil or coconut oil, or in a mineral oil such as liquid paraffin. The oily suspensions may contain a thickening agent, for example beeswax, hard paraffin or cetyl alcohol. Sweetening agents, such as those set forth above, and flavoring agents may be added to provide a palatable oral preparation. These compositions may be preserved by the addition of an antioxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavoring and coloring agents, may also be present.

The pharmaceutical compositions of the invention may also be in the form of oil-in-water emulsions. The oily phase may be a vegetable oil, for example olive oil or arachis oils, or a mineral oil, for example liquid paraffin or mixtures of these. Suitable emulsifying agents may be naturally-occurring gums, for example gum acacia or gum tragacanth, naturally-occurring phosphatides, for example soya bean lecithin, and esters or partial esters derived from fatty acids and hexitol anhydrides, for example sorbitan mono-oleate, and condensation products of the said partial esters with ethylene oxide, for example polyoxyethylene sorbitan monooleate. The emulsions may also contain sweetening and flavoring agents.

Syrups and elixirs may be formulated with sweetening agents, for example glycerol, sorbitol or sucrose. Such formulations may also contain a demulcent, a preservative and flavoring and coloring agents. The pharmaceutical compositions may be in the form of a sterile injectable preparation, for example as a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1,3-butane diol. Among the acceptable vehicles and solvents that may be employed are water, Ringer's solution and isotonic sodium chloride solution. In addition, sterile, fixed oils are conventionally employed as a solvent or suspending medium. For this purpose any bland fixed oil may be employed including synthetic mono-or diglycerides. In addition, fatty acids such as oleic acid find use in the preparation of injectables.

It may also be administered in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials are cocoa butter and polyethylene glycols.

Dosage levels of the order of 1 mg. to 100 mg. per kilogram of body weight per day are useful in the novel method of treatment of this invention. Generally an effective dosage range is 5 to 50 mg. of the compound per kilogram of body weight per day.

The amount of active ingredient that may be combined with the carrier materials to produce a single dosage form will vary depending upon the host treated and the particular mode of administration. For example, a formulation intended for the oral administration to humans may contain from 5 mg. to 5 gm. of active agent compounded with an appropriate and convenient amount of carrier material which may vary from about 5 to about 95 percent of the total composition. Dosage unit forms will generally contain between from about 25 mg. to about 500 mg. of 5-mercaptopyridoxine.

It will be understood, however, that the specific dose level for any particular patient will depend upon a variety of factors including the activity of the specific compound employed, the age, body weight, general health, sex, diet, time of administration, route of administration, rate of excretion, drug combination and the severity of the particular disease undergoing therapy.

The following are illustrative of the techniques that may be employed in the preparation of pharmaceutical formulations to be utilized in the practice of the invention.

EXAMPLE 1

A mixture of 250 parts of 5-mercaptopyridoxine and 25 parts of lactose is granulated with suitable water, and to this is added 100 parts of maize starch. The mass is passed through a 16 mesh screen. The granules are dried at a temperature below 60°C. The dry granules are passed through a 16 mesh screen, and mixed with 3.8 parts of magnesium stearate. They are then compressed into tablets suitable for oral administration.

EXAMPLE 2

A mixture of 50 parts of 5-mercaptopyridoxine, 3 parts of the calcium salt of lignin sulphonic acid, and 237 parts of water is ball-milled until the size of substantially all of the particles of the acid is less than 10 microns. The suspension is diluted with a solution containing 3 parts of sodium carboxymethylcellulose and 0.9 parts of the butyl ester of p-hydroxybenzoic acid in 300 parts of water. There is thus obtained an aqueous suspension suitable for oral administration for therapeutic purposes.

EXAMPLE 3

A mixture of 250 parts of pyrithioxine, 200 parts of maize starch and 30 parts of alginic acid is mixed with a sufficient quantity of 10% aqueous paste of maize starch, and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 4

A mixture of 500 parts 5-mercaptopyridoxine, 60 parts maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

EXAMPLE 5

1. Tablets — 10,000 scored tablets for oral use, each containing 500 mg. of active ingredient are prepared from the following ingredients:

| | Gm. |
|---|---|
| 5-mercaptopyridoxine hydrochloride | 5000 |
| Starch, U.S.P. | 350 |
| Talc, U.S.P. | 250 |
| Calcium stearate | 35 |

The powdered 5-mercaptopyridoxine hydrochloride is granulated with a 4% w./v. aqueous solution of methylcellulose U.S.P. (1,500 cps.). To the dried granules is added a mixture of the remainder of the ingredients and the final mixture compressed into tablets of proper weight.

2. Capsules — 10,000 two-piece hard gelatine capsules for oral use, each containing 250 mg. of 5-mercaptopyridoxine are prepared from the following ingredients:

| | Gm. |
|---|---|
| 5-mercaptopyridoxine | 2500 |
| Lactose, U.S.P. | 1000 |
| Starch, U.S.P. | 300 |
| Talc, U.S.P. | 65 |
| Calcium stearate | 25 |

The powdered 5-mercaptopyridoxine is mixed with the starch-lactose mixture followed by the talc and calcium stearate. The final mixture is then encapsulated in the usual manner. Capsules containing 10, 25, 50, and 100 mg. of 5-mercaptopyridoxine are also prepared by substituting 100, 250, 500 and 1,000 gm. for 2,500 gm. in the above formulation.

3. Soft elastic capsules — One-piece soft elastic capsules for oral use, each containing 200 mg. of 5-mercaptopyridoxine hydrochloride are prepared in the usual manner by first dispersing the powdered active material in sufficient corn oil to render the material capsulatable.

4. Aqueous suspension — An aqueous suspension for oral use containing in each 5 ml., 1 gm. of 5-mercaptopyridoxine is prepared from the following ingredients:

| | | |
|---|---|---|
| 5-mercaptopyridoxine | gm. | 2000 |
| Methylparaben, U.S.P. | gm. | 7.5 |
| Propylparaben, U.S.P. | gm. | 2.5 |
| Saccharin sodium | gm. | 12.5 |
| Glycerin | ml. | 3000 |
| Tragacanth powder | gm. | 10 |
| Orange oil flavor | gm. | 10 |
| F. D. & C. orange dye | gm. | 7.5 |
| Deionized water, q.s. to 10 liters | | |

What is claimed is:

1. A method of treating rheumatoid arthritis which consists of administering to a patient in need of such treatment an effective amount of 5-mercaptopyridoxine, pyrithioxine, or pharmaceutically acceptable salts thereof.

2. The method of claim 1 wherein the active ingredient is 5-mercaptopyridoxine.

3. The method of claim 1, wherein the active ingredient is pyrithioxine.

* * * * *